United States Patent [19]
Johnson, Jr.

[11] Patent Number: 5,385,069
[45] Date of Patent: Jan. 31, 1995

[54] DEVICE FOR DETERMINING THE VOLUME OF OBJECTS USING A CHAMBER WITH TWO RESONATORS TO COMPENSATE FOR TEMPERATURE AND HUMIDITY EFFECTS

[75] Inventor: Virgil E. Johnson, Jr., Gaithersburg, Md.

[73] Assignee: Hydronautics Research, Inc., Fulton, Md.

[21] Appl. No.: 925,198

[22] Filed: Aug. 6, 1992

[51] Int. Cl.$^6$ .................. G01M 7/00; G01N 29/00; G01F 17/00
[52] U.S. Cl. .................................. 73/571; 73/149; 73/579; 73/708
[58] Field of Search ............... 73/149, 579, 571, 708

[56] References Cited

U.S. PATENT DOCUMENTS

| | | | |
|---|---|---|---|
| 2,666,326 | 1/1954 | Poole et al. | 73/149 |
| 3,494,185 | 2/1970 | Watanabe et al. | 73/149 |
| 4,640,130 | 2/1987 | Sheng et al. | 73/579 |
| 4,811,595 | 3/1989 | Marciniak et al. | 72/149 |
| 4,949,584 | 8/1990 | Lade et al. | 73/865.8 |
| 4,991,433 | 2/1991 | Warnaka et al. | 73/290 V |
| 5,054,316 | 10/1991 | Pratt et al. | 73/149 |

FOREIGN PATENT DOCUMENTS 2-170019  6/1990  Japan ..................... 73/149

OTHER PUBLICATIONS

Institue of Phys. Sciences in Medicine; "Relationship between Density and Body Weight in Prematurely Born Infants Receiving Different Diets", London, England 1987.

NY Engl J Med; "Diet, Fat Accretion and Growth in Premature Infants"; vol. 305, pp. 1495–1500, 1981.

NY Acad Sci; "Densitometric Analysis of Body Composition: Revision of Some Quantitative Assumptions"; vol. 110; pp. 113–140, 1963.

Growth; "Body Composition of the Reference Fetus"; vol. 40, pp. 329–341, 1976.

J Biomed Eng; "Development of an Air Displacement Method for Whole Body Volume Measurement of Infants"; vol. 7, pp. 9–17; 1985.

Pediatrics: "Body Composition During Growth. In Vivo Measurements and Biochemical Data Correlated to Differential Anatomical Growth"; vol. 47, pp. 264–274, 1971.

NY Acad Sci; "Inconstancy of the Lean Body Mass"; vol. 110, pp. 141–152, 1963.

NY Acad Sci; "An Air Displacement Method of Measuring Body Volume in Babies: A Preliminary Communication"; vol. 110, pp. 75–79.

J Accoustical Soc Am; "Use of A Resonating Cavity to Measure Body Volume"; vol. 77(2), pp. 756–758, 1985.

Primary Examiner—Richard E. Chilcot, Jr.
Assistant Examiner—William L. Oen
Attorney, Agent, or Firm—James J. Brown

[57] ABSTRACT

The invention is a device and method for the non-invasive determination of the volume of an object which may be animate. The invention employs the principal of the Helmholtz resonator to simultaneously measure acoustic resonance signals which are characteristic of the container enclosing the object and a separate resonator disposed within the container, thereby permitting determination of the body volume independent of the influence of variations in temperature and humidity.

9 Claims, 4 Drawing Sheets

DEVICE FOR DETERMINING THE VOLUME OF OBJECTS USING A CHAMBER WITH TWO RESONATORS TO COMPENSATE FOR TEMPERATURE AND HUMIDITY EFFECTS

SUMMARY OF THE INVENTION

The present invention is directed to a method and device for the non-invasive determination of the volume of an object which may be, for example, a human being or other animate object, independently of the influence of temperature and humidity. The device and method of the invention utilize the acoustic resonance of a resonant cavity to determine the volume of an object in that cavity, and especially makes use of the acoustic resonance of a second resonator disposed within the cavity to compensate for temperature and humidity fluctuations. The invention avoids the need for "scanning" the cavity with an externally supplied, variable frequency acoustic wave to determine the resonance or "Helmholtz" frequency of the cavity.

BACKGROUND OF THE INVENTION

It is generally recognized that it is important to be able to determine the body density and, therefore, body volume of objects such as human adults or newborn infants, especially those whose growth and development must be carefully monitored. Clearly, such determinations, while essential, should involve techniques which are as accurate, non-invasive, least disturbing, and efficiently as performed as possible.

Previously known techniques for measuring body volume which involve underwater or hydrostatic weighing and water displacement, for example, are undesirable because of the inherent trauma caused to the person, especially when it is an infant.

Other non-invasive means of measuring body volume are based on containing the object in an airtight chamber, altering the pressure or volume in varying degrees of sophistication and applying thermodynamic principles to deduce the body volume. Generally, long times (up to an hour) requiring repetitive measurements (with empirical correction factors) are needed to establish adequate repetitiveness and accuracy using these techniques.

The inherent difficulties of air displacement devices are: large volume of an air tight container relative to body volume required to prevent asphyxiation; and the thermodynamic process is not simply isothermal or adiabatic, particularly when measurement time is long compared to characteristic times involved in heat transfer and gas exchange as in infant breathing.

These known air displacement volume measuring devices are therefore complex and used only for research and are not likely to become generally available for routine use.

Other systems have employed the principle of the Helmholtz resonator to determine the volume of gas in a container. These systems have however depended on the speed of sound remaining constant between the time that the resonant frequency of the empty chamber is determined and the time that the resonant frequency is determined for the chamber containing the object of unknown volume. Temperature and humidity variations, however, effect the consistency of the speed of sound and therefore the accuracy of techniques which depend on this constancy. Variations in temperature and humidity, for example, are especially pronounced when the object of unknown volume itself produces heat and humidity, such as a living animal.

It is, therefore, an object of the present invention to provide an improved device and method for the quick, easy and inexpensive non-invasive determination of volume of an object which overcomes disadvantages of the prior art and in which variations in temperature, humidity and other factors affecting frequency of sound waves are compensated out.

It is a further object of the present invention to provide such a device and method in which determinations of volume can be accurately made in a single procedure and without the need for insuring isothermal conditions and conditions of constant humidity.

PRIOR ART

U.S. Pat. No. 4,640,130 to Sheng et al. describes a non-invasive method and apparatus for measuring the volume of an object such as an infant using the principle of the Helmholtz resonator under essentially isothermal conditions and recognizes the effect of temperature changes on resonant frequency and therefore the accuracy of measurements. A container having a cavity containing gas and an opening is subjected to a variable frequency loud speaker. The resonant frequency of the cavity is proportional to the volume of the cavity. By placing an object to be measured in the cavity, the change in the resonance frequency of the cavity before and after the object is placed in the cavity is an indication of the volume of the object.

U.S. Pat. No. 4,811,595 to Marciniak et al. describes a system for monitoring fluent material within a container in which acoustical energy output of a source is varied in frequency between limits to sweep a frequency band encompassing cavity resonance conditions which depend on the quantity of a fluent material within a tank excited by such acoustical energy. The volume of the fluent material is calculated from the excitation frequency registered during verified detection of resonance conditions, based on abrupt changes in signal characteristics and stored data relating to the geometry of the acoustic sensor arrangement through which the tank interior is monitored.

U.S. Pat. No. 4,949,584 to Lade et al. describes an apparatus for measuring the depth of a chamber by using the chamber as the resonator of an electronic oscillator whose oscillations are coupled to fluid in the cavity by transducers. The resonant frequency of both the variable depth main chamber and a second reference chamber of fixed depth are measured simultaneously. Variations in the data obtained from the chambers are caused by factors affecting the velocity of propagation of sound in the fluid. Measurement of the depth of the main chamber is obtained from the fixed-depth reference chamber.

U.S. Pat. No. 4,991,433 to Warnaka et al. describes a system for monitoring fluid material within a container in which acoustical energy is directed into a vessel containing an unknown volume of fluid at frequency at or near the Helmholtz resonance of the vessel. The signal generated within the vessel is analyzed to compare its phase relationship to an electrical reference input signal. The volume of fluid in the vessel may then be determined from this phase relationship, such as by previous empirical calibration of the vessel.

U.S. Pat. No. 2,666,326 to Poole et al. describes a volume measuring device which utilizes the principle that the natural sonic frequency of resonance of an acoustic resonator is dependent only on the volume of the resonator and the length of cross-sectional area of the throat and is independent of the shape of the resonator. The volume of a "sample" cavity is determined by comparing its natural resonant frequency with the natural resonant frequency of an accurately predetermined volume of a second "master" cavity. The difference in the two frequencies is a measure of the volume of the "sample".

BACKGROUND LITERATURE

Dell, R.B., Aksoy, Y., Kashyap, S., Forsythe, M., Ramakrishnan, R. Zucker, C., and Heird, W.C., "Relationship between Density and Body Weight in Prematurely Born Infants Receiving Different Diets, "In Vivo Body Composition Studies, Editors: K.J. Ellis, S. Yasumura, and W.D. Morgan, Chapter 13, *Institute of Phys. Sciences* in Medicine, London, England, 1987.

Reichman, B., Chessex, P., Putet, G., Verellen, A., Smith, J.M., Heim, T., and Swyer, P.R., 1981, "Diet, Fat Accretion and Growth in Premature Infants," *N Engl J Med* 305, 1495–1500.

Brozek, J., Grande, F., Anderson, J.T., and Keys, A., 1963, "Densitometric Analysis of Body Composition: Revision of Some Quantitative Assumptions," *Ann NY Acad Sci*, 110, 113–140.

Ziegler, E.E., O'Donnell, A.M., Nelson, S.E., and Foman, S.J., 1976, "Body Composition of the Reference Fetus," *Growth* 40, 329–341.

Taylor, A., Aksoy, U., Scopes, J.W., du Mont, G., and Taylor, B.A., 1985, Development of an Air Displacement, Method for Whole Body Volume Measurement of Infants," *J Biomed Eng*, 7, 9–17.

Friis-Hansen, B., 1971, "Body Composition During Growth. In Vivo Measurements and Biochemical Data Correlated to Differential Anatomical Growth," *Pediatrics*, 47, 264–274.

Wedgwood, R.J., 1963, "Inconstancy of the Lean Body Mass," *Ann NY Acad Sci*, 110, 141–152.

Falkner, F., "An Air Displacement Method of Measuring Body Volume in Babies: A Preliminary Communication," *Ann NY Acad Sci*, 110, 75–79.

Deskins, W.G. et al., "Use of a Resonating Cavity to Measure Body Volume," 1985, *J. Accoustical Soc. Am.*, 77(2), 756–758.

DETAILED DESCRIPTION OF THE INVENTION

Figure 1:
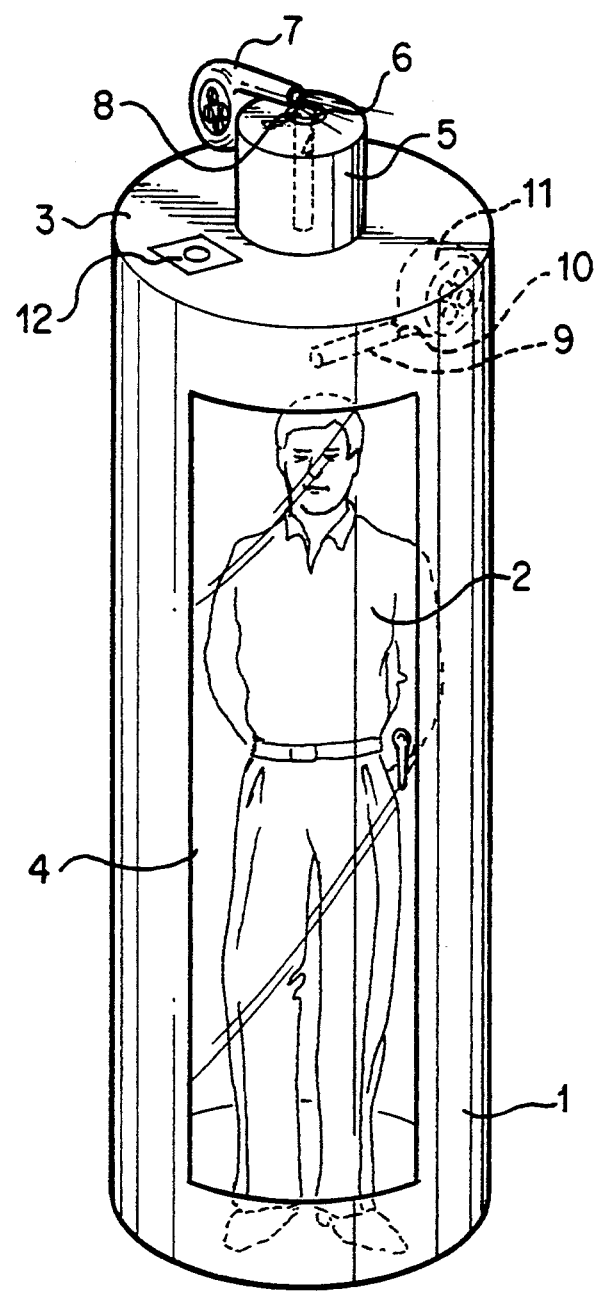
FIG. 1 is a perspective view of one embodiment of the present invention with an adult human subject.

In accordance with the present invention, a device is provided for measuring the volume of an object which essentially comprises a chamber having an opening and adapted to accommodate the object whose volume is to be measured. The interior of the chamber is provided with a device such as an elongated tube or acoustic pipe having at least one open end and capable of producing an acoustic wave of relatively high resonant frequency in response to a stream of gas directed across the open end from a blower or other gas supply device. A similar device is provided for directing a second stream of gas across the opening of the container to produce another acoustic wave of relatively low resonant frequency. The respective resonant frequencies of the acoustic waves of the container and tube are determined by instruments such as pressure sensitive transducers which produce signals in response to the respective resonant frequencies.

Employing the principal of a Helmholtz resonator, as will be further explained below, the characteristic resonant frequency of the chamber will depend on the volume of gas (e.g. air) in the chamber irrespective of shape. By calibrating the chamber both when containing only gas and when containing objects of known volume it is, therefore, possible to arrive at an expression directly relating the unknown volume of an object in the chamber to the resonant frequency observed for the chamber enclosing that object.

As already noted, however, this relationship is effected by such parameters as temperature and humidity which effect the propagation of acoustic waves. The use, however, of a device within the chamber for producing a second acoustic resonance of relatively high frequency which is characteristic of the size and configuration of the acoustic pipe used as well as properties of the gas permits compensation to be made by factoring out the influence of these parameters such that the volume of the object being measured is related directly and accurately only to the ratio of the observed resonant frequency of the chamber to the pipe frequency and is independent of temperature and humidity.

The size and shape of the container employed in the present invention will, of course, be determined by the size, shape and character of the object whose volume is being determined. As illustrated in the drawings, an upright chamber may be more appropriate for determinations involving adults or non-infant children while a horizontally elongated structure may be more convenient for prone objects such as infants.

The device within the chamber for generating acoustic waves having characteristic resonant frequencies can be produced by any device, whose frequency depends only on geometry and sound speed although as described below, a particularly advantageous system is a simple "whistle" or "organ pipe" which produces the required acoustic wave by directing a stream of gas across an open tube or orifice.

As will be explained in greater detail below, measurement of body volume is accomplished quickly and easily be placing the object in the closed container. Essentially simultaneously, separate streams of gas (typically air) are directed across the opening provided in the neck of the container and across a tube or "organ pipe" or other similar device within the chamber to produce separate resonant acoustic waves whose respective characteristic frequencies are registered and transmitted to recording and processing equipment.

The invention will, however, be more fully appreciated by having reference to the following detailed description.

As illustrated in FIG. 1 of the drawings, a subject, 2 is disposed within an upright cylindrical chamber, 1, having a door or other closure 4. At the top of the chamber 3 is a cylindrical neck 5 which opens into the chamber 1 at its lower end but is closed at its top except for throat 6, which is a small open ended cylindrical tube extending into the neck 5 and providing an opening 8 which is essentially flush with the top surface of neck 5. A blower 7 directs a thin stream of air across the opening to produce a first acoustic wave having a resonant or "Helmholtz" frequency characteristic of the chamber 1 and which is a function of the volume of air or other gas in chamber 1. In other words, the characteristic Helmholtz frequency of the chamber will vary accordingly to the volume of the subject 1 since this volume of gas will be displaced by the subject in the chamber.

Disposed within chamber 1 is a small hollow tube or pipe 9 having at least one open end 10 across which a stream of gas (air) from the interior of the chamber is directed by blower 11 using gas within the chamber to produce essentially simultaneously with the first acoustic wave a second resonant frequency which is characteristic of the gas within the chamber and the dimensions of the pipe 9. This resonant frequency will be significantly higher (in the order of 100 times) than the frequency of the chamber resonator 6, but will reflect the same influence of humidity and temperature. The two resonant frequencies can be measured independently by separate devices or by a single pressure responsive transducer 12 having sufficient range and sensitivity to respond to both high and low frequency acoustic waves.

In order to illustrate the relationships which permit determination of volume in accordance with the present invention, independent of fluctuations in temperature, humidity and other factors which effect the propagation of acoustic waves the following parameters are identified:

$V_b$ = volume of the subject, 2.
$V_o$ = empty volume of chamber 1.
$f_b$ = frequency of acoustic resonance of chamber 1 resulting when stream of air is directed over opening 8.
A = cross section area of throat 6
C = speed of sound
$l_n$ = effective length of throat 6
V = net volume of gas enclosed in chamber 1
$l_p$ = effective length of pipe 9
$f_t$ = resonant frequency of pipe 9 resulting when stream of air is directed over opening 10.

While it will be appreciated that appropriate data processing, recording and display equipment is usefully connected to the device of the invention to produce instantaneously and automatically the desired values reflecting measured body volume, the actual basis for these calculations is as follows:

When the enclosed net volume, V, is $V_o - V_b$ and the measured frequency is $f_b$, the volume, $V_b$, may be determined using the relationship:

$$\frac{V_b}{V_o} = 1 - \frac{AC^2}{V_o 4\pi^2 l f_b^2} = 1 - \text{Const} \frac{C^2}{f_b^2} \quad (1)$$

The sound speed, c, depends on the ratio of specific heats of the gas, the gas molecular weight and the gas temperature. As already noted, it is desirable to account for variations in the sound speed by some method other than calculations which are influenced by temperature and humidity fluctuations. For example, if the container, $V_o$, is first placed in a position adjacent to the volume to be measured, but not containing $V_b$, excitation will result in a resonant frequency, $f_o$. If it is assumed that the measurements of $f_o$ and $f_b$ are made within a short interval (say less than a minute) it may be assumed that the sound speed is identical for both measurements. Now the sound speed may be eliminated from Equation [1] so that $$\frac{V_b}{V_o} = 1 - \left(\frac{f_o}{f_b}\right)^2 \quad (2)$$

Clearly, however, the assumption of identical sound speeds for the two conditions, $f_o$ and $f_b$, may not apply and errors will be introduced. The present invention provides a means of eliminating the influence of the sound speed without measuring the empty vessel frequency.

The rigid tube 9, having effective length, $l_p$, within chamber 1 (open or closed at one end) as shown in FIG. 1 is excited (as an organ pipe) by the jet from blower 11. The first mode of an open-ended organ pipe will resonate at frequency, $f_t$, given by the following equation $$f_t = \frac{C}{2l_p} \quad (3)$$

The effective length is longer than the actual length by an amount related to the area of the pipe and the details of the geometry at the ends.

Equation 3 shows that the organ pipe 9 has a unique linear relationship between frequency and sound speed, that is $$f_t = K_t C \quad (4)$$

where $K_t$ is a constant

If the frequency, $f_t$, is measured at the same time as, $f_b$, (with the container enclosing $V_b$) Equations [1], [3] and [4] may be combined to give:

$$\frac{V_b}{V_o} = 1 - K\left(\frac{f_t}{f_b}\right)^2 \quad (5)$$

Where K is a new contant.

In practice, Equation [5] shows that a calibration made with known values of $V_b$ will produce the quadratic relationship given by Equation [5] independent of changes in the atmosphere or temperature.

It is important to recognize that according to the present invention the only quantities to be measured are the acoustic frequencies ( or periods ) of oscillation of the pipe 9 and Helmholtz chamber 1. The amplitude of either oscillation is unimportant to the volume measurement. The final operating frequencies and amplitudes are selected so as to be harmless to the subject while producing accurate results with a minimum of effort by the operator.

In Equation [5] the Volume, $V_b$, is related to the ratio $f_t/f_b$. Typically $f_t$ will be roughly 100 times $f_b$. This suggests that the signal from the resonator may be used to "gate" the higher frequency signal from the organ pipe and obtain the ratio $f_t/f_b$ directly. That is, the number of organ pipe cycles counted during one resonator cycle is the ratio $f_t/f_b$. Consequently, the electronic system, used in the proposed invention can consist of a piezoelectric crystal installed in the wall of the organ pipe to produce an adequate, $f_t$, signal. The low frequency measurement can be made using a small compliant reflective membrane (not illustrated) stretched over a hole in the resonator. A self-contained optical reflective sensor (also not shown) can be mounted such that one or two reflections per cycle of the resonance sound will be detected. The optical sensor signal can be conditioned to put out a 50 percent duty cycle which will be used to gate the higher frequency organ pipe signal into a counter. Several periods of the low frequency are typically used to guarantee accuracy. For example, if the low frequency is 20 HZ and the high is 2000 HZ and there is an average over fifty cycles of the low frequency, and assuming that the number of cycles can be measured to the nearest ¼ cycle will only take 2.5 seconds for a reading with an accuracy of approximately 0.5% in $f_t/f_b$ and a corresponding accuracy of 1% in the measured volume.

Alternatively, a single piezoelectric pressure responsive sensor can be used to pick up low frequency resonance of the chamber and the higher frequency resonance of the pipe in the chamber and transmit electrical signals reflecting these acoustic waves to appropriate data procesing equipment. A typical device of this type which can advantageously be employed in the invention, as shown in FIG. 1 at 12 is the "Pressure Zone Microphone" described in U.S. Pat. No. 4,361,736 and sold by Tandy Corporation; having a frequency response of 20–18,000 Hz.

Figure 2:
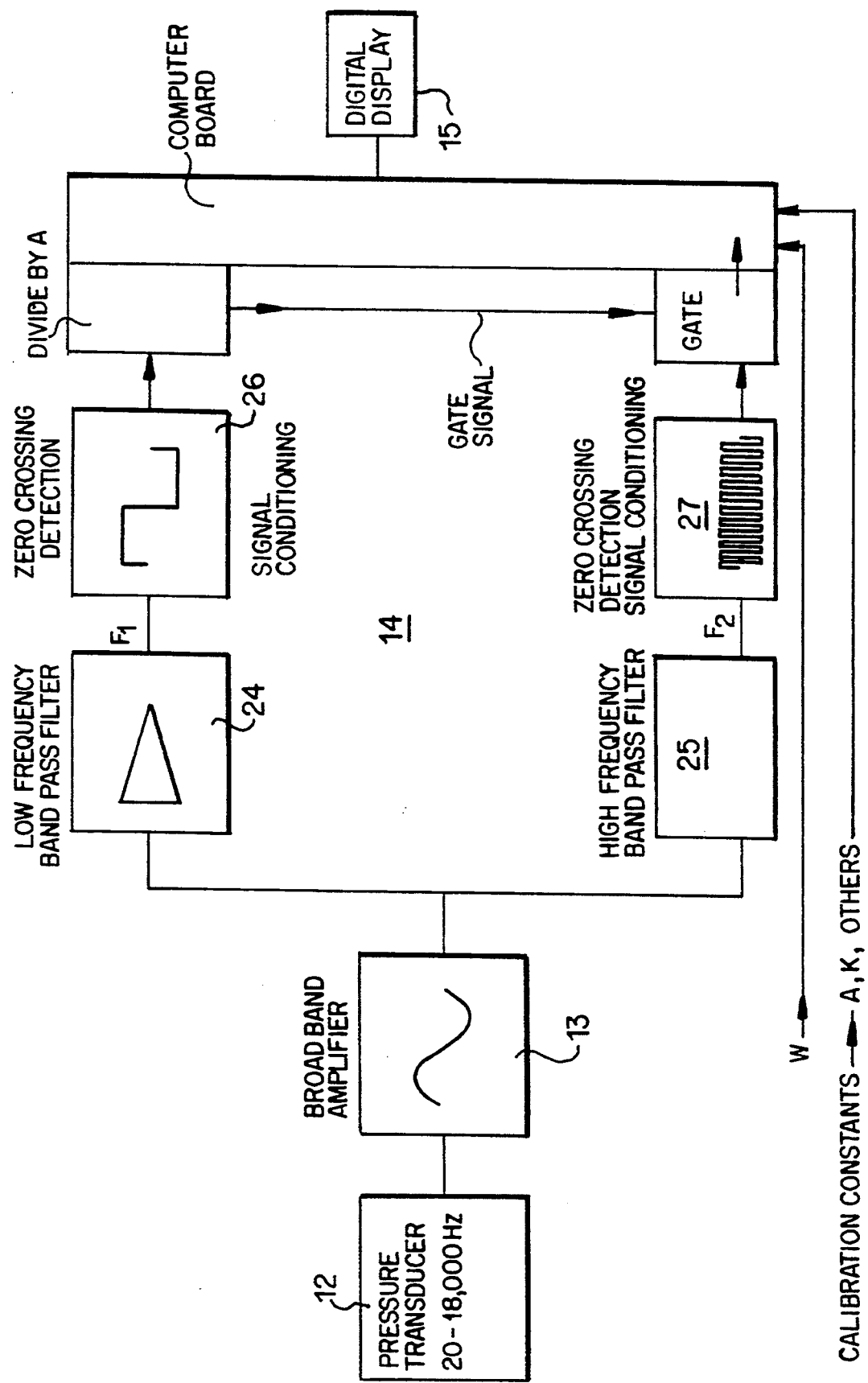
FIG. 2 is a block flow diagram illustrating processing of data in accordance with the invention.

FIG. 2 is a block flow diagram illustrating the processing of data according to the invention whereby resonant frequencies $f_t$ and $f_b$ are received either together from sensor 12 or independently from separate sensors (not shown) by amplifier 13. The values $f_t$ and $f_b$ are received and processed in micro processor 14 along with the calculated constants K and $V_o$ in accordance with equation (5) to produce a value $V_b$ for the volume of the body being measured. Low frequency signal $f_b$ and high frequency signal $f_t$ are processed and conditioned separately in microprocessor 14 by passing them through filters 24 and 25 respectively and conditioners 26 and 27. Conveniently, the value of $V_b$ can be digitally displayed or integrated with other parameters such as body weight to give values for density, body fat fraction, etc. and displayed on digital display 15.

Figure 3:
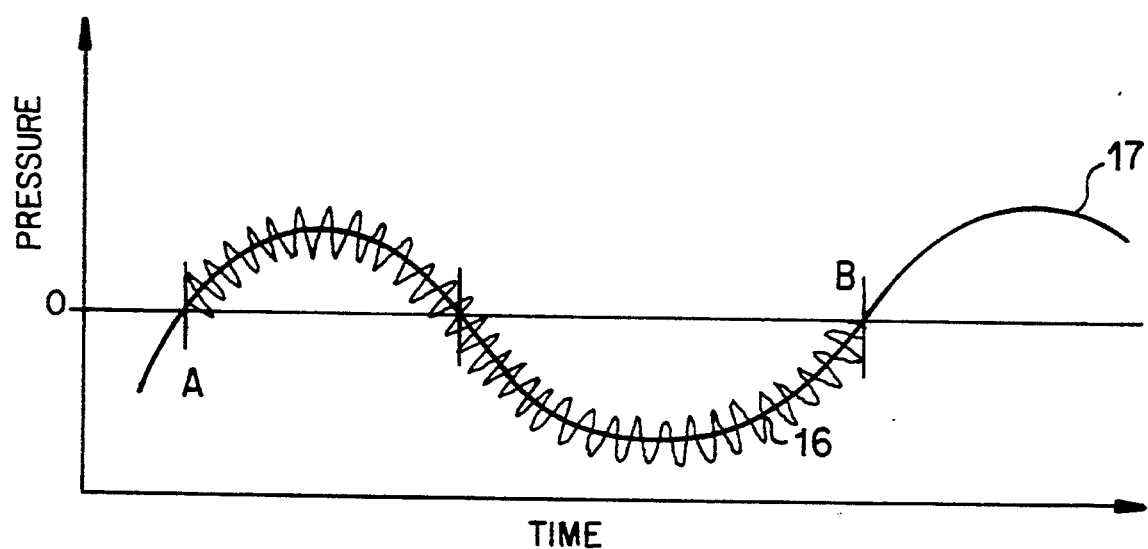
FIG. 3 illustrates typical frequency responses obtained by the invention.

FIG. 3 illustrates a typical signal response that will be observed using a single sensor in accordance with the invention. The higher frequency resonance $f_t$ of the pipe is shown at 16 superimposed on the low frequency resonance of the chamber $f_b$ at 17. One low frequency period is shown between the points A and B. Accordingly, the value of $f_t/f_b$ will be the number of waves or periods, 16, counted between A and B.

The present invention can be employed to determine the volume of any essentially in-compressible body, animate or otherwise. Particularly when used to determine the volume of human subjects, it will be appreciated that the accuracy of results is enhanced by minimizing the presence in the chamber of extraneous material such as clothing or other objects which occupy volume and increase acoustic damping.

Figure 4:
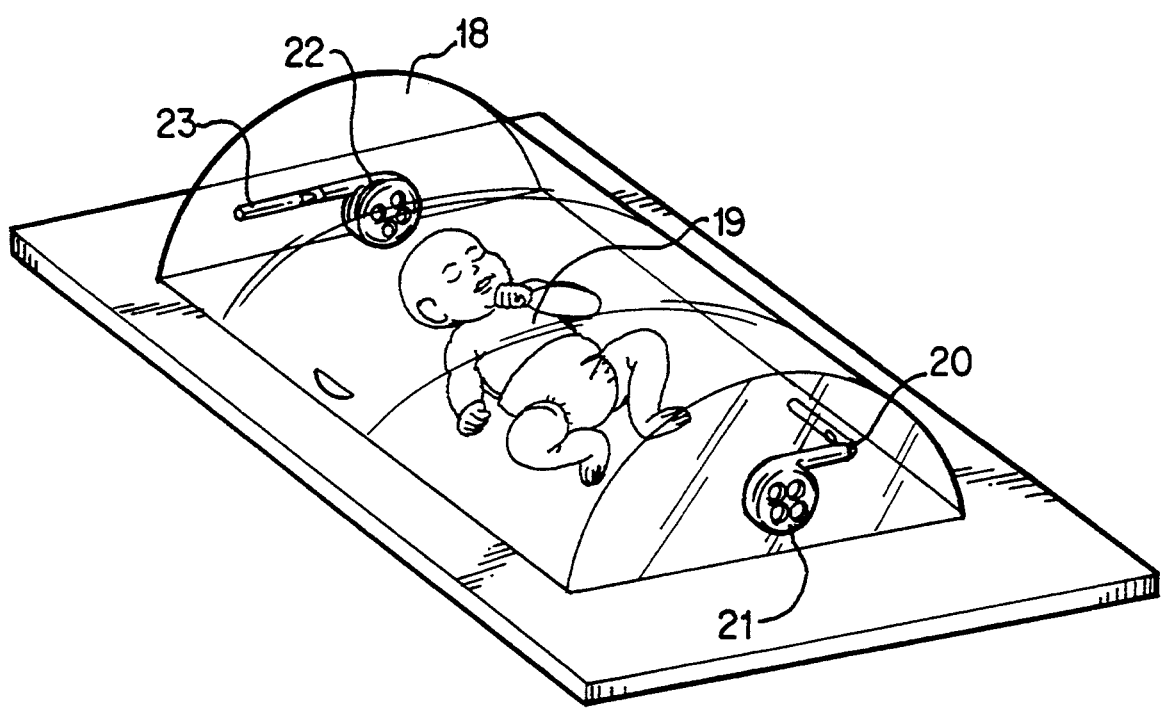
FIG. 4 illustrates an embodiment of the invention for measuring the body volume of an infant.

FIG. 4 illustrates an infant 19 enclosed by chamber 17 in a prone position. The characteristic resonant frequency $f_b$ is obtained by a stream of air being blown over throat 20 by blower 21. A second stream of air within the chamber is directed over pipe 23 by blower 22 to produce resonant frequency $f_t$. The sensor or sensors used to register and transmit $f_b$ and $f_t$ are not shown. Volume of the infant is determined in accordance with the above described procedure.

In order to minimize the influence of container shape it is important to select the nominal Helmholtz frequency such that the acoustic wave length is about an order of magnitude greater that the largest dimension of the container. Thus, the nominal frequency for a six foot high adult volumeter should be lower than about 20 Hz and lower than about 75 Hz for an eighteen inch long volumeter for an infant.

In the foregoing description, the invention has been described with reference to a particular preferred embodiment, although it is to be understood that specific details shown are merely illustrative, and the invention may be carried out in other ways without departing from the true spirit and scope of the invention as defined in the following claims.

What is claimed is:

1. A device for measuring the volume of an object comprising:
   a chamber having an opening and configured to accommodate the object whose volume is to measured;
   a first resonator positioned within said chamber for producing a first resonant acoustic wave having a frequency, $f_b$, which is characteristic of said first resonator and independent of the volume of said chamber;
   a second resonator for producing a second resonant acoustic wave having a frequency, $f_t$, lower than the frequency of said first wave and characteristic of the volume, $V_o$, in said chamber;
   means for determining the respective resonant frequencies, $f_b$ and $f_t$, of said first and second acoustic waves and for producing signals characteristic of said respective resonant frequencies; and
   an information processor for receiving and analyzing said signals in accordance with the equation:

$$V_b = V_o\left[1 - K\left(\frac{f_t}{f_b}\right)^2\right],$$

where,
   $f_t$ is the frequency of said second resonant wave,
   $f_b$ is the frequency of said first resonant wave,
   $V_o$ is the empty volume of said chamber,
   $V_b$ is the volume of said object and,
   K is a constant whose value is calculated from said equation using known values of $f_t$ and $f_b$ for known volumes $V_b$ and $V_o$,
whereby the volume, $V_b$, of said object in said chamber is determined independently of the influence of humidity and temperature within the chamber.

2. The device of claim 1 wherein said resonator for producing a first resonant acoustic wave is a tube open at at least one end and means for directing a stream of gas across said open end to produce said first resonant acoustic wave.

3. The device of claim 2 wherein said resonator for determining the respective resonant frequencies and producing characteristic signals are two separate frequency responsive means, one disposed proximate the opening of said chamber and one proximate said elongated tube.

4. The device of claim 3 wherein one of said means for determining resonant frequency is disposed proximate said opening of the chamber and the other is disposed proximate said means for producing said first resonant acoustic wave.

5. The device of claim 1 wherein said means for determining the respective resonant frequencies and producing characteristic signals is a single device.

6. The device of claim 1 wherein one of said resonators for producing first and second resonant acoustic waves is a device for directing a stream of gas across an orifice.

7. The device of claim 6 wherein said means for producing a second resonant acoustic wave is device for directing a stream of gas across said chamber opening.

8. A device for measuring the volume of an object independently of the influence of variations in temperature and humidity comprising:
- a chamber having an opening and adapted to accommodate the object whose volume is to be measured;
- first means for producing a first resonant acoustic wave which is characteristic of said means positioned within said chamber, said means comprising a tube open at at least one end and means for directing a stream of gas across said opening;
- second means for directing a stream of gas across the opening of the chamber to produce substantially simultaneously with said first wave a second resonant acoustic wave lower than the frequency of said first wave and characteristic of the volume of gas in said container;
- means for determining the respective resonant frequencies of said first and second acoustic waves and for producing signals characteristic of said respective resonant frequencies; and
- information processing means for receiving and analyzing said signals whereby the volume of said object in said chamber is determined independently of the influence of humidity and temperature within said chamber.

9. A method for determining the volume, $V_b$, of an object independently of the influence of temperature and humidity which comprises:
- placing said object in a gas filled container having a known empty volume, $V_o$, and an opening therein and first means positioned in said container for producing a first acoustic wave having resonant frequency $f_t$ characteristic of said first means and second means for producing a second resonant frequency of $f_b$ characteristic of said container substantially simultaneously with producing said first wave producing first and second said acoustic waves;
- determining the respective resonant frequencies $f_b$ and $f_t$ of said first and second waves;
- calculating the volume, $V_b$, of said object in accordance with the equation:

$$V_b = V_o \left[ 1 - K \left( \frac{f_t}{f_b} \right)^2 \right]$$

where K is a constant whose value is calculated by calibration using determinations of $f_t$ and $f_b$ with known volumes $V_b$ and $V_o$.

* * * * *